(12) United States Patent
Delmoro et al.

(10) Patent No.: US 6,620,030 B1
(45) Date of Patent: Sep. 16, 2003

(54) DUAL GRINDSTONE

(75) Inventors: Richard L. Delmoro, Tallmadge, OH (US); Dave Krause, Hartville, OH (US); David Poling, Sr., Akron, OH (US)

(73) Assignee: Akron Special Machinery, Inc., Akron, OH (US)

( * ) Notice: Subject to any disclaimer, the term of this patent is extended or adjusted under 35 U.S.C. 154(b) by 0 days.

(21) Appl. No.: 09/678,242

(22) Filed: Oct. 4, 2000

(51) Int. Cl.⁷ .................................................. B24B 5/36
(52) U.S. Cl. ............................ 451/11; 451/28; 451/49; 451/57; 451/456
(58) Field of Search ........................... 451/11, 28, 49, 451/67, 65, 246, 254, 258, 456

(56) References Cited

U.S. PATENT DOCUMENTS

| | | | |
|---|---|---|---|
| 3,932,965 A | * 1/1976 | Kline, Jr. ..................... | 51/281 |
| 4,041,647 A | * 8/1977 | Ugo .............................. | 51/106 R |
| 4,736,546 A | 4/1988 | Ugo .............................. | 51/106 A |
| 4,936,054 A | * 6/1990 | Rogers et al. ............. | 451/11 X |
| 5,185,960 A | * 2/1993 | Majerus et al. ............. | 51/104 |
| 6,062,950 A | * 5/2000 | Morgan ....................... | 451/28 |

\* cited by examiner

*Primary Examiner*—Joseph J. Hail, III
*Assistant Examiner*—Anthony Ojini
(74) *Attorney, Agent, or Firm*—Reese Taylor

(57) ABSTRACT

A grinder for use with a tire uniformity machine and being selectially moved into and out of contact with a tire mounted in the tire uniformity machine and including a pair of rotatable grindstones for grinding the tire carried by a grinding head. The grindstones are moved radially toward and away from the tire and are driven by one or more motors mounted on the grinding bead for rotating the grindstones in opposite directions relative to each other.

15 Claims, 4 Drawing Sheets

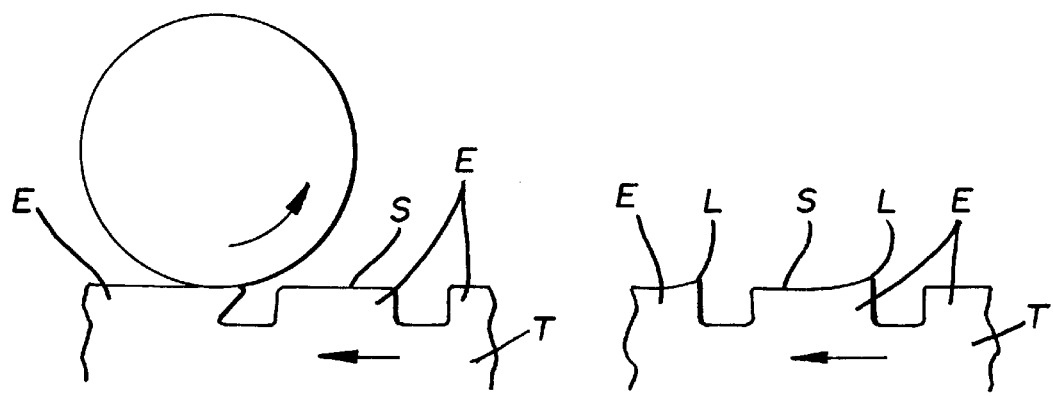
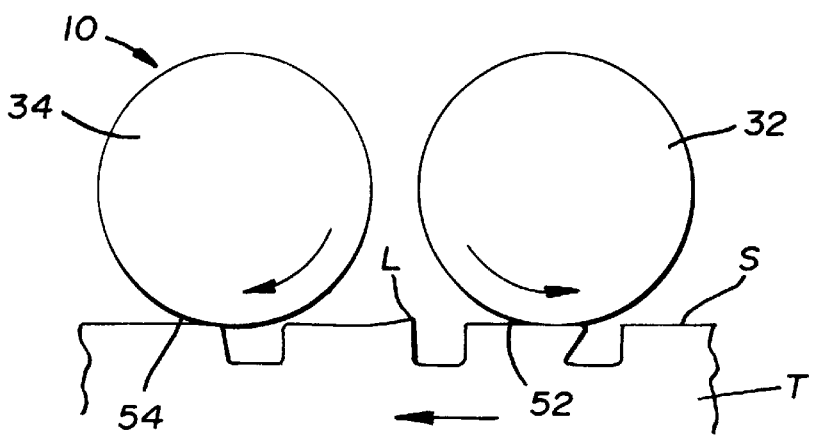
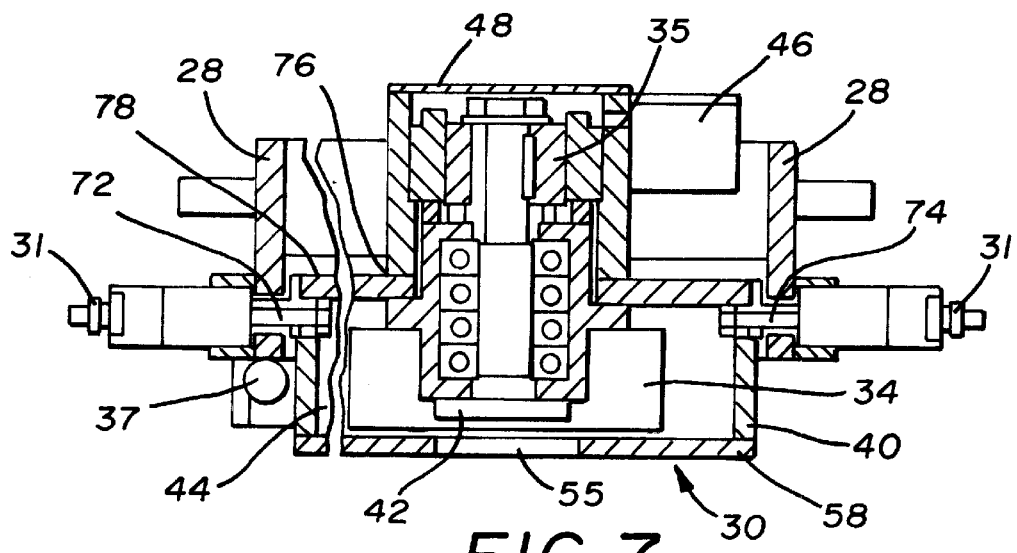

DUAL GRINDSTONE

Patent application Ser. No. 09/678,241 filed Oct. 4, 2000, entitled Tire Uniformity Machine Grinder.

FIELD OF THE INVENTION

The present invention generally relates to tire uniformity machines. The present invention more particularly relates to a grinding apparatus in a tire uniformity machine. Most particularly, the present invention relates to a dual grinding stone apparatus used for removing material from tires in a tire uniformity machine.

BACKGROUND OF THE INVENTION

In tire uniformity machines, a tire is tested by rotating it at various speeds to ensure that the tire has been constructed and performs within quality control standards. During this testing process, the tire is rotated and the tire uniformity machine examines the tire's shape and surface characteristics to a high degree of accuracy. At times, during examination, the tire uniformity machine detects irregularities in the tire. Any irregularity in the surface and shape of the tire may be corrected by removing material from appropriate portions of the tire.

To remove material, known tire uniformity machines typically employ a grinder having a single cylindrical grindstone rotating in relation to the rotation of the tire. As the tire rotates, the grindstone is selectively brought into contact with the tire to remove material.

In known grinders the application of the grindstone occurs in a rotary fashion. The typical grinder has a pivoting arm on which the grindstone and its motor are mounted. Often a motor and gear box arrangement is used to control the speed and direction of rotation of the grindstone. The motor is then connected to the grindstone or gearbox by belts or chains and a series of pulleys or sprockets. As will be appreciated, the motor needed to drive the series of belts or chains and the gear box are bulky and the available area for positioning of this unit is limited. In fact, the typical motor housing projects to such an extent that the confines of the tire uniformity machine prevent the grindstone from being actuated in a linear fashion. To overcome this, known tire uniformity machines attach the motor distally from the grinder on an arm that houses the drive belt or chain. In this way, the motor is located away from the instrumentation, the load wheel, and other devices that must be placed proximate to the test tire, where there is more space. The arm is mounted on a pivot such that the motor housing moves radially in a limited area. The pivot is located between the motor and grindstone, and the arm rotates under the force of a hydraulic cylinder attached to the arm on one side of the pivot. The typical hydraulic cylinder acts transversely of the arm and, thus, is mounted on a separate frame member than the frame member on which the arm pivots. So mounted, the hydraulic cylinders reduce visibility and access to the grinder and the area surrounding the grinder.

Due to the rotation of the arm, the grinder may not be aimed directly at the tire center. In other words, the center line and the contact point of the grinder travel in an arc in an attempt to tangentially contact the tire. As will be readily understood, initiating contact with the tire in this manner makes it difficult to make good, accurate contact in a repeatable manner. Further, the housing of the grinder must be adjusted to clear the machine housing and attempt to make proper contact between the grinder and the tire. Specifically, the grinder housing often is connected to a vacuum supply to remove particles created by the grinding process, and this housing must be made to closely fit about the grindstone. Since the housing closely fits about the grindstone, in these devices, simple rotation of the arm may cause the housing to contact the rotating tire. As will be appreciated, such contact could significantly damage the grinding apparatus and may cause damage to the tire.

To avoid such contact and to better position the grindstone to remove material, known devices adjust the position of the housing and grindstone by rotating the housing relative to the arm. To make this adjustment, known devices incorporate a series of linkages. In some cases, as many as five linkages may be used. Due to machining tolerances, each link is a potential source of error. When multiple links are used, this error is compounded making it more significant in terms of accurate removal of the tire material. These errors make it difficult to achieve good contact with the tire.

Also, when two grinding stones are used, it virtually eliminates the grinder's ability to have both stones strike the tire simultaneously; and some cases may cause one stone to be out of contact with the tire T. A second stone is often used in an attempt to remove a lip or other irregularities created by the leading stone, as described more completely below. When linkage errors result in the trailing stone not being in contact with the tire, the trailing stone is precluded from performing its corrective function.

In known grinders, the amount or rate of material removal from the tire is often measured as a function of the grind current of the single motor driving the stone or stones. In a two-stone apparatus, the grind current measurement, of the single motor, would not be able to provide information on the percentage of work done by each grinder, and thus, if one stone was completely out of contact, this condition would go undetected. Further, the components linking the motor to the grindstones including belts or chains introduce additional error into this measurement.

Turning to the removal of material from the tire, known devices typically employ a generally cylindrical grindstone that rotates about a central axis of rotation. As best shown in prior art FIG. 1, the radial profile of the cylindrical grindstone leaves a lip L at each break in the periphery of the tire at the leading side, with respect to grindstone rotation, of the tire elements E, where the grindstone has made contact. It is believed that the lip L is formed by the rotation of the grindstone. As the grindstone encounters tire elements E separated by breaks in periphery of the tire T, the radial force of the stone causes deformation of the tire element E in the radial direction. At the same time, the tangential force of the stone acting on the relatively weak, generally flexible tire element E causes the tire element E to bend in the direction of the grindstone's rotation. Thus, the leading portion of the tire element E is ground to a lesser extent because it has been deflected away from the grindstone. Once the element is past the grindstone, the deflected element returns to its resting position with an irregular profile, as shown in FIG. 2. This irregularity is often referred to as a lip L.

In a single stone apparatus, attempts have been made to remove the lip by reversing the rotation of the tire and grinding in the opposite direction. Unfortunately, the result of this reversal is a corresponding lip on the opposite side of the tire element. Dual grindstones were introduced as an attempt to use a second grindstone to remove the lip. As described above, the error introduced by linkages that adjust the position of the grinding head, however, interfered with proper contact of the grindstones resulting in incomplete removal of the lip L. Or, in cases where the second stone did not contact the tire, the lip L remained completely intact.

SUMMARY OF THE INVENTION

It is an object of the present invention to provide a grinder that reduces lip formation caused by the rotary action of a typical grinder.

It is a further object of the present invention to provide a grinder that reduces the error associated with the use of multiple linkages.

It is a further object of the present invention to linearly actuate the grinder into contact with the tire.

In view of at least one of these objects, the present invention provides a grinder in a tire uniformity machine that receives a tire for testing, the grinder including a grinding head adapted to selectively contact the tire, wherein the grinding head includes a leading grindstone and a trailing grindstone located behind the leading grindstone relative to the rotation of the tire; and at least one motor causing the leading grindstone and trailing grindstone to rotate in opposite directions relative to each other.

The present invention further provides a grinder in a tire uniformity machine that receives a tire for testing, the grinder including an arm received in bearings, a grinding head supported on the arm, the grinding head having a pair of rotatable grinding stones and at least one motor causing the rotation of the grinding stones, and a linear actuator operatively engaging the arm to selectively cause axial movement thereof causing the grindstones to selectively contact the tire.

The present invention further provides a grinder in a tire uniformity machine receiving a tire having a central axis for testing, the grinder including a support member, bearings mounted on the support member; an arm carried on the bearings and moveable toward or away from the central axis of the tire on the bearings; a grinding head supported on an end of the arm proximate the tire, the grinding head including a pair of rotatable grindstones adapted to contact the tire and at least one motor causing the rotation of the grindstones; and a linear actuator operatively engaging the arm causing the grindstones to move linearly to contact the tire.

The present further provides a grinding head in a grinder for a tire uniformity machine having a frame, the tire uniformity machine receiving a tire for testing within the frame, the grinder head including a pair of grindstones rotatably supported in a shroud; and a pair of motors mounted on the shroud each operatively engaging one of the grindstones.

It accordingly becomes a principal object of this invention to provide a dual grindstone of the character above-described with other objects thereof becoming more apparent upon a reading of the following brief specification considered and interpreted in view of the accompanying drawings.

BRIEF DESCRIPTION OF THE DRAWINGS

FIG. 1 is a prior art figure schematically depicting the lip formed by a typical single stone grinder.

FIG. 2 is a schematic side elevational view of a tire depicting the lip left by a prior art grinder.

FIG. 3 is a schematic view of a grinder according to the present invention depicting removal of material from the tire.

FIG. 7 is a cross sectional view of the grinders as seen along line 7—7 in FIG. 4.

DETAILED DESCRIPTION

A dual grinder according to the present invention is generally referred to by the numeral 10 in the accompanying drawing figures. Dual grinder 10 is used to remove material from a tire T. Tire T is located in a tire uniformity apparatus (not shown) and accordingly is rotatably mounted, about a central axis CA, within the tire uniformity machine. During operation of the tire uniformity machine, tire T may be caused to rotate, by an appropriate drive mechanism, such that the tire T rotates about central axis CA. The tire uniformity machine causes the tire T to rotate to evaluate aspects of the tire T including its surface characteristics.

To that end, a load wheel is moved into and out of engagement with the periphery of the tire T and various sensors may be employed to obtain information about the tire's integrity, shape, and surface qualities. Irregularities in the surface S of tire T may be corrected by appropriate removal of material from the surface S. To remove material, grinder 10 is selectively brought into contact with the surface S of tire T.

Figure 4:
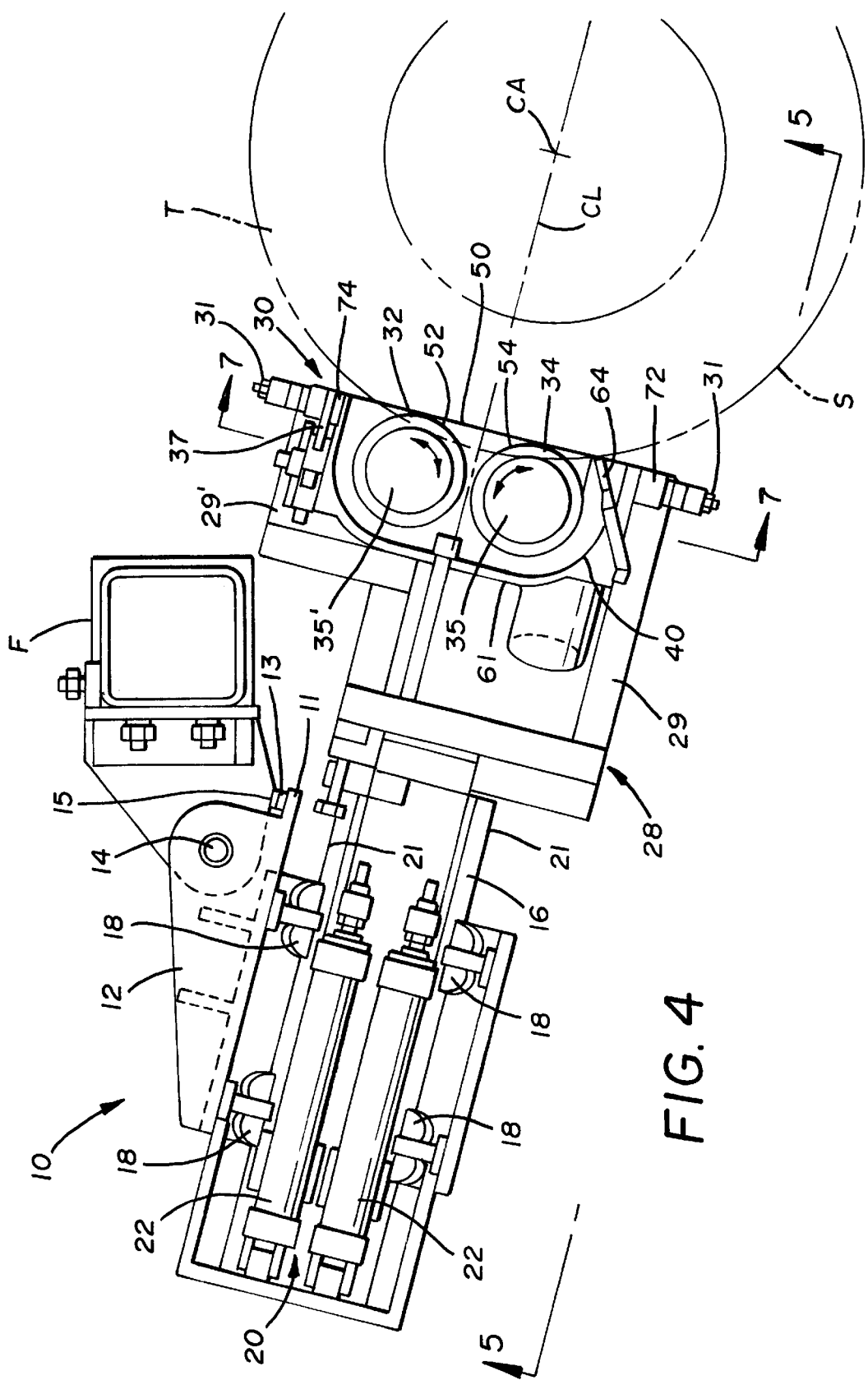
FIG. 4 is top plan view of a grinder in a tire uniformity machine according to the present invention.

Grinder 10 is suitably supported proximate to tire T to affect such contact, for example, by a frame F. Frame F may be an independent support or a part of the tire uniformity machine, as shown. Grinder 10 generally includes a support member 12 attached to frame F. As shown in FIG. 4, support member 12 may be provided with a pivot 14 to allow for radial adjustment of support member 12 relative to the frame F. Pivoting of the support member 12 allows the grinder 10 to be aligned with the tire to ensure proper contact between the grinder 10 and tire T. The center line CL of grinder 10 may be aligned with the central axis CA of tire T to achieve simultaneous contact of the dual grindstones of grinder 10.

Once aligned, the grinder 10 may be positively locked into place such that it remains aligned during the grinding process.

To that end, support member 12 may be provided with a pivot stop 11 extending from support 12. Further, a bumper 13 and shim 15 may be provided between the frame and support member 12 to adjust spacing. It will be appreciated that, adjustment shim 15 and bumper 13 may be located between the frame F and pivot stop 11. Thus, the radial position of support member 12 may be adjusted by varying the size of the shim 15 and then the grinder 10 may be locked against frame F. Alternatively, a dynamic adjustment system may be used incorporating appropriate sensors for determining the position of the grinder 10 relative to the tire T and its center line CL and an appropriate actuator, responsive to the sensors, for changing the radial position of the grinder 10 by movement of support member 12 relative to the frame F. In this way, the grinder 10 may be appropriately aligned with respect to the tire T. Preferably, the center line CL of grinder 10 will be aligned with the axis CA of the tire T.

Figure 5:
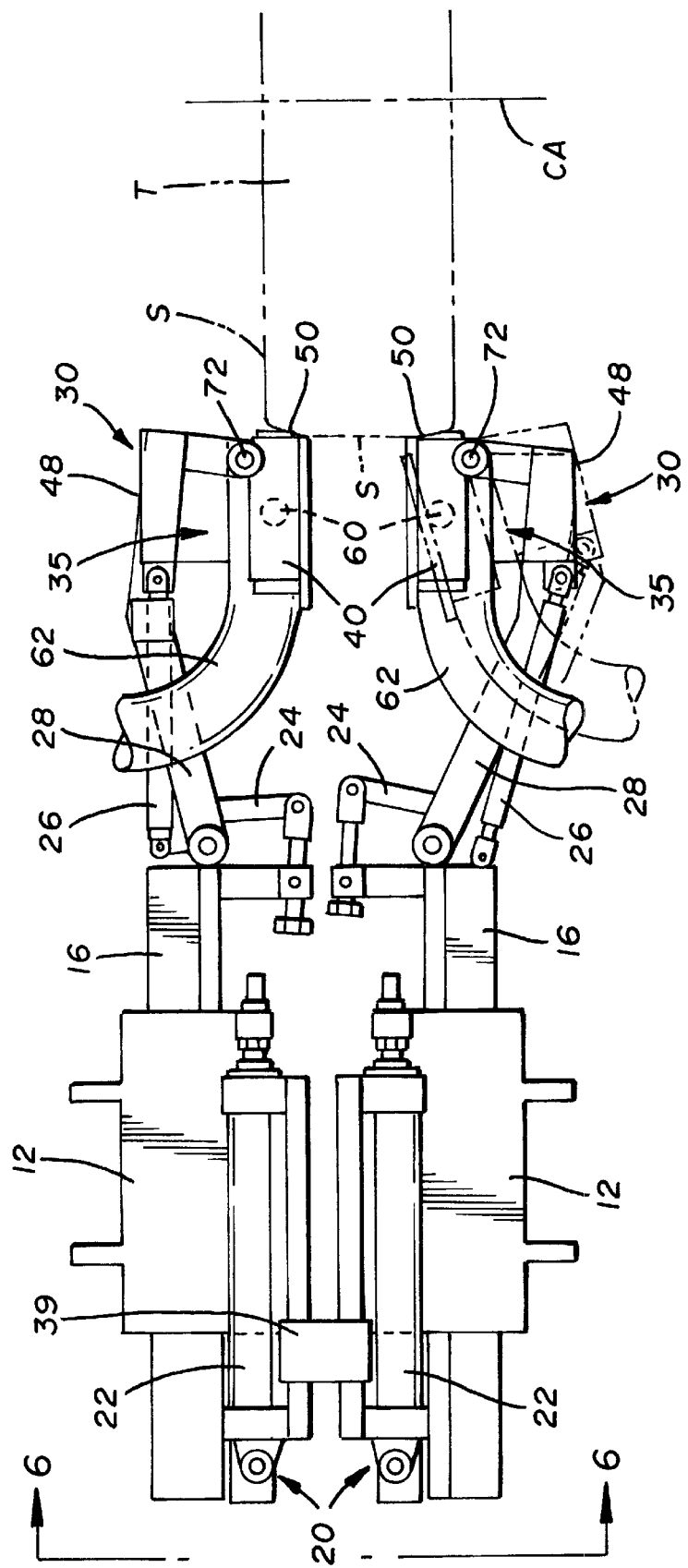
FIG. 5 is a front elevational view of the grinder depicted in FIG. 4.
Figure 6:
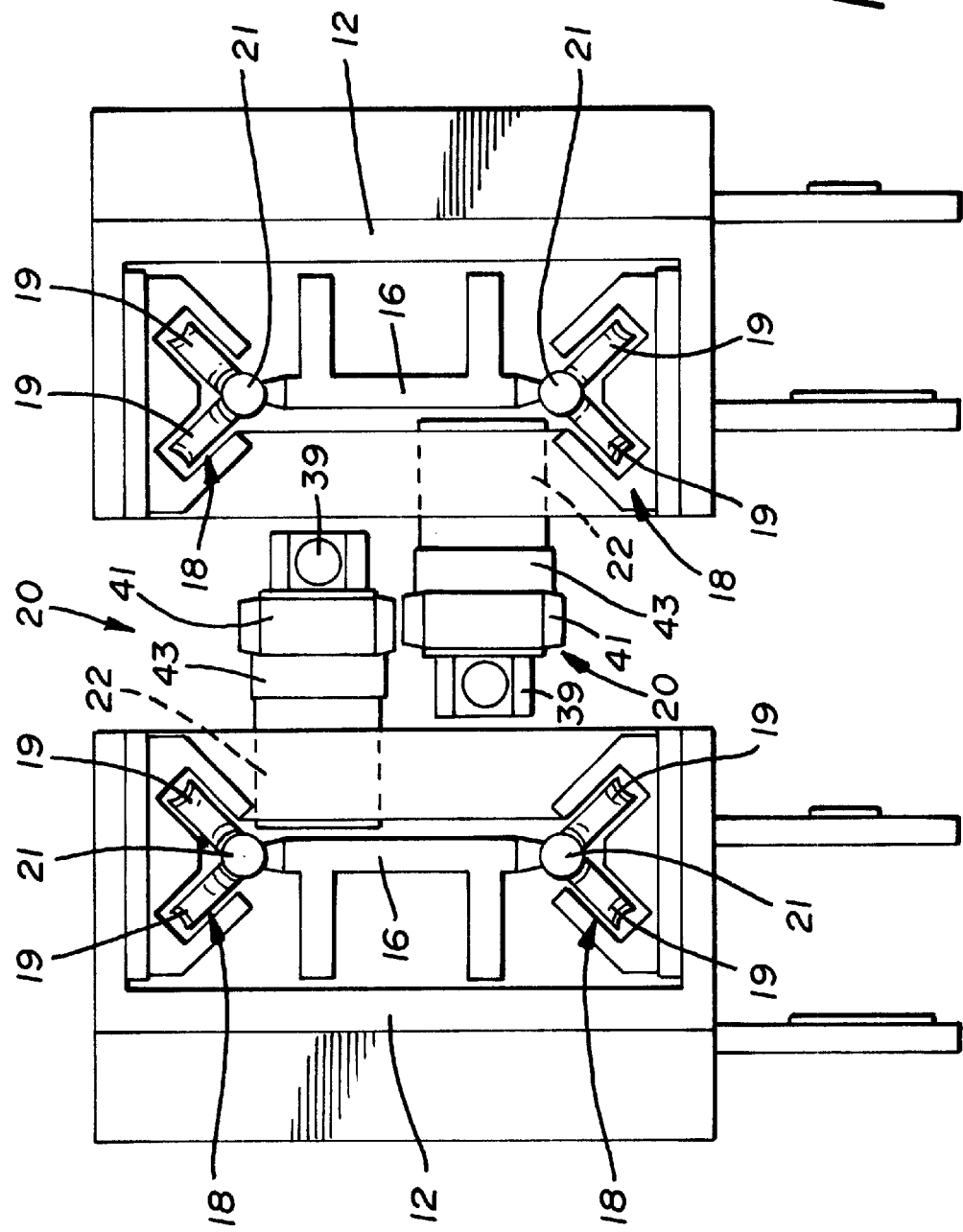
FIG. 6 is an end view of the grinders as seen along line 6—6 in FIG. 5.

One or more arms 16 are held in spaced relation by support member 12. Arms 16 are supported on bearings 18 that facilitate substantially linear movement of the arms 16 toward and away from the tire T. Bearings 18, as shown in FIG. 6, are linear bearings and may include rollers 19 suitably mounted on support member 12. Rollers 19 are vertically aligned to receive edges 21 of arms 16. Offset bearings 18, such as those shown in FIG. 6, may be employed and located at either side of the edges 21 of arm 16 to help resist forces acting on the arm 16 and maintain the position of the arm 16. Referring to FIGS. 4 and 5, bearings 18 may be located in fore and aft positions on the support member, and longitudinally aligned to guide the arm 16 upon actuation.

The arms 16 are actuated by a suitable linear actuator generally referred to by the numeral 20, including fluid driven actuators, such as, hydraulic or pneumatic cylinders, motor driven actuators, electric actuators and the like. In the embodiment shown, actuator 20 includes a pair of cylinders 22 that expand to drive the arms 16 toward tire T and retract to pull the arms 16 away from the tire T.

As previously discussed, the manipulation of grinder 10 may be controlled by various methods available in the art. For example, hydraulic or pneumatic cylinders 22 may be employed to extend and retract the arm 16 carrying grinding heads 30. In such a case, supply lines (not shown) carrying fluid from a fluid supply may used to selectively direct fluids to the cylinders 22 and to apply a motive force. The activation of these cylinders 22 may be coordinated by sensor 37 located in sensing relation to tire T or grinding head 30. The sensor 37 being in communication with a controller 39 that controls the fluid supply to the cylinders 22. In the embodiment shown, a servo valve 41 is used to control the flow of fluid passing through a manifold 43 that supplies the cylinders 22. As a result of the flow control, position of the grinding head 30 relative to the tire T is controlled.

Additionally, the position of grinding heads 30 relative to each other and tire T may be adjusted as required by the particular tire T. To that end, arms 16 are provided with a separation adjuster 24 and a tilt adjuster 26 engaging ends 28 of arms 16. The ends 28 may be made pivotable to allow spacing of grinding heads 30 relative to each other or arms 16. To provide further manipulation of grinding head 30, grinding head 30 may be pivotally attached to ends 28 of arms 16. As best shown in FIG. 4, grinding head 30 may be pivotally mounted between spaced members 29 of ends 28 and rotate or tilt therebetween, as described more completely below. While the grinder 10 may be oriented in any position and the tilting may be varied accordingly, the grindstone 32 substantially lies in a plane parallel to the plane of the tire T. When the grindstone 32 is tilted, the grindstone 32 deviates from this plane and generally rotates between a plane substantially parallel to that of the tire T to a plane substantially perpendicular to that of the tire T. As can be appreciated, the amount of tilt may be limited by appropriate stops or limiters, and the tilt adjuster 26 may control the amount and rate of tilt. Tilt adjuster 26 extends from arm 16 or end 28 to grinding head 30 to control the amount of tilt of grinding head 30. To limit the range of motion of grinding head 30, an adjustable pivot lock 31 may engage grinding head 30. In this way, the adjustment members 24, 26 may be used to alter the spacing of grinding head 30, or to tilt the grinding heads 30 relative to the tire T and arms 16. Various adjustment members 24, 26 may be used including mechanical actuators such as threaded members, gears, ratchet members, fluid cylinders, or cams; or electric actuators including linear rails. Alternatively, spacing and tilt may be adjusted by moving the grinding heads 30 on the frame F, arm 16 or support member 12.

Grinding heads 30 are supported on ends 28 of arms 16. Ends 28 may include a pair of spaced members 29 that receive grinding head 30 therebetween. Grinding heads 30 generally include a pair of grindstones 32, 34 driven by at least one motor 35. As shown in FIG. 4, each grindstone 32, 34 may be driven directly by a motor 35, 35' located adjacent each grindstone 32, 34. The motor 35 is supported adjacent to grindstones 32, 34 and may be mounted to the ends 28 of arms 16 or to shroud 40 itself. The grindstones 32, 34 are operatively attached to the motor 35 and may be driven directly thereby. Each grindstone 32, 34 may be operated by its own individual motor 35. By using a single motor 35 for each grindstone 32, 34, the size of motors 35, 35' are reduced. Directly driving each grindstone 32, 34 may further reduce motor size in comparison to known systems that require a pulley or sprocket drive assembly. Further, the grind current and, thus, the operation of each grindstone may be measured for each motor to give a percentage representation of the work done by each motor.

When the grindstones 32, 34 are driven directly, the inertia of the drive system is reduced in comparison to known systems incorporating a large motor located distally from the grindstones with a series of belts or chains connecting the motor to a gear box that controls the direction of the stones. The reduced inertia of a directly driven system improves the rate and initiation of a reversal of the grindstones 32, 34. By reversing the grindstones 32, 34 quickly the directly driven system may significantly reduce processing time when reversal is necessary.

As best shown in FIG. 7, the motor 35 may be secured adjacent to the shroud 40. The shaft 42 of motor 35 extends through an opening formed within the shroud and extends into the grinding chamber 44, defined by the shroud 40, where it is coupled to the grindstone 32, 34. Power to the motor 35 is supplied conventionally by cables and may connect to the motor 35 at a junction box 46. To protect the components of motor 35, a housing 48 is provided to substantially cover the exposed surfaces of motor 35. To help contain and remove these particles, the shroud 40 closely fits over grindstones 32, 34. The shroud 40 may generally define an opening 50 located radially outwardly from the axis of rotation of grindstones 32, 34 and spaced therefrom such that the grinding surfaces 52, 54 of grindstones 32, 34 are exposed. Further, shroud 40 may define an opening 55 axially spaced from the grindstones 32, 34 to allow access to the interior 44 of shroud 40 for purposes of cleaning or to repair or replace the grindstones 32, 34. During operation, the axially spaced opening 55 may be closed by a suitable cover 58.

The shroud 40 may be provided with a nozzle 60 attached to a vacuum source open to the interior of the shroud 40 for the removal of particulate created during the grinding process. When the shroud 40 has a curved wall 61, as shown in FIG. 4, the nozzle 60 may open into chamber 44 tangentially, as best shown in FIG. 5. A nozzle 60 may be integrally formed with shroud 40 and is fluidly connected to the vacuum source by a hose 62. To further aid in the removal of particulate, a jet nozzle 64 may direct a supply of fluid toward the tire T to attempt to expel particulate lodged within the treads of tire T or on the surface S thereof. Jet 64 is fluidly connected to a supply distal from the grindstone 32. Jet 64 may be located outside of or within shroud 40. Preferably, jet 64 is located near the tire T and may be positioned such that it is centrally located within the vacuum stream created by the vacuum source, as discussed in the copending application referred to above.

The shroud 40 is open toward the tire T exposing a portion of the grindstones 32, 34 to the tire T. The sensor 37 may be mounted on the shroud 40 or proximate thereto to determine the amount of material removed from the tire T. Sensor 37 communicates with controller 39 which accordingly controls the movement of grindstones 32, 34.

When removing material from the tire T, contact is made by leading grindstone 32 relative to the rotation of the tire T and the trailing grindstone 34, located behind leading grindstone 32, contacts the tire T slightly thereafter. The grindstones 32, 34 may rotate in the same direction about their respective axes of rotation or they may rotate in opposite directions with respect to each other. For example, as shown in FIG. 2, the leading grindstone 32 may rotate in a clockwise direction and the trailing grindstone in a counterclockwise direction. Depending on the particular tire T, the rotation of grindstones 32, 34 may be altered relative to the direction of rotation of tire T. For example, each grindstone 32, 34 may have its own motor 35 with each motor driving the grindstone 32, 34 in either a clockwise or counterclockwise direction. Alternatively, belts, gears, or other known means may be used to drive and control the direction of rotation of both grindstones 32, 34 when a single motor is used.

As previously discussed, the position of the arms 16 and thus the grinding heads 30 may be controlled by selectively extending or retracting the arms by way of the linear actuator 20. Extension of the arms 16 may be used to simultaneously place both grindstones 32, 34 of the grinding head into contact with surface S of tire T. In this way, the grinding head 30 is directly driven by a single actuator 20 into contact with the tire T. Once in contact, the leading and trailing grindstones 32, 34 remove material from the tire T in consecutive fashion. The leading grindstone 32 may remove the bulk of the material with the trailing grindstone 34 removing any lip L or irregularity left by the leading grindstone 32. Once sufficient material is removed from the tire T, the linear actuator 20 retracts the arm 16 pulling the grindstones 32, 34 away from the tire T. If the axes of the grindstones are laterally aligned with respect to each other, the grindstones 32, 34 are generally withdrawn from the surface S of tire T at the same time.

Since grinding may occur at the treads, sidewall, or the shoulder therebetween, the grinding head including the shroud 40 and motor 35 may be made pivotable about an axis 70. In the embodiment shown, the end 28 of the arm 16 attaches to the shroud 40 of grinding head 30 at a pair of pivot points 72, 74 located on either side of the shroud 40. As shown in FIG. 5, the pivot points 72,74 may be located generally near the base 76 of the motor 35 and in substantial alignment with the top portion 78 of the shroud 40. A tilt adjuster 80 may extend between the arm 16 and the housing of the motor 35, wherein displacement of the tilt adjuster 26 pivots the grinding head 30 about the axis 70 defined by pivot points 72, 74. In this way, the grindstones 32, 34 may be rotated to contact the sidewall, shoulder, or tread in substantially parallel relation to the surfaces if desired. It will be appreciated that depending on the type of irregularity that is to be removed from the tire T, the grinding surfaces 52, 54 of the grindstones 32, 34 may be positioned at various angles.

It will further be appreciated that it may be desirable to obtain different surface characteristics for different tires T or portions thereof. Consequently, differing grinding treatment of tires T may be required as various tires T are tested at the tire uniformity machine. To accommodate the variance in tires T, the speed and direction of rotation of grindstones 32, 34 in general and relative to each other may be varied either through controlling the speed of the motors 35, or through the use of other known means including pulley or gear differentials. Further, grindstones 32, 34 having a different grit may be selected to obtain a desired surface characteristic.

It will still further be appreciated that the grinding head 30 and motor head 35 may be retrofit to existing grinders with little or no modification.

While a full and complete description of the invention has been set forth in accordance with the dictates of the patent statutes, it should be understood that modifications can be resorted to without departing from the spirit hereof or the scope of the appended claims.

What is claimed is:

1. A grinder in a tire uniformity machine having a frame that receives a tire having a central axis for testing, the grinder comprising an arm received in bearings;

a grinding head supported on the arm, said grinding head having a pair of rotatable grinding stones and at least one motor causing the rotation of the grinding stones;

a linear actuator operatively engaging the arm to selectively cause axial movement thereof causing the grindstones to selectively contact the tire; and wherein said arm is pivotally attached to the frame and selectively lockable therewith, whereby said arm may be moved radially to position the center line of said grindstones and selectively lock said arm in place.

2. The grinder of claim 1, wherein said pair of grinding stones defines a center line and wherein said grinding head is movable relative to said tire.

3. The grinder of claim 2 wherein the center line of the said grindstones is aligned with the central axis of the tire such that said linear actuator causes the grindstones to simultaneously contact the tire.

4. The grinder of claim 2 further comprising a pair of end members extending generally axially from said arm, wherein said grinding head is pivotally supported between the end members.

5. The grinder of claim 4 further comprising a tilt adjuster extending between said arm and said grinding head.

6. The grinder of claim 4, wherein said end members are pivotally attached to said arm at a pivot.

7. The grinder of claim 6 further comprising spacing adjusters extending between said arm and said end members, said spacing adjusters adapted to cause rotation of said end members about the pivot.

8. The grinder of claim 1, wherein said arm has a radial adjuster for adjusting the radial position of said arm relative to the frame.

9. The grinder of claim 1, wherein said radial adjuster is a dynamic adjuster system.

10. The grinder of claim 1, wherein a first motor drives one of said grindstone and second motor drives the other of said grindstones.

11. The grinder of claim 10, further comprising a controller operatively connected to said first motor and second motor, whereby said controller monitors the amount of work done by each said motor.

12. The grinder of claim 11, wherein said controller is in communication with the linear actuators, whereby said controller adjusts the position of said linear actuator based on feedback from said first and second motors whereby the position of said grindstone relative to the tire may be controlled.

13. The grinder of claim 1, wherein said at least one motor is located on said grinding head.

14. The grinder of claim 13, wherein said motor has a shaft axially aligned with at least one said grindstone and coupled thereto whereby said motor directly drives said grindstone.

15. The grinder of claim 13, wherein said motor is reversible and its speed is controllable.

* * * * *